ated Aug. 19, 1958

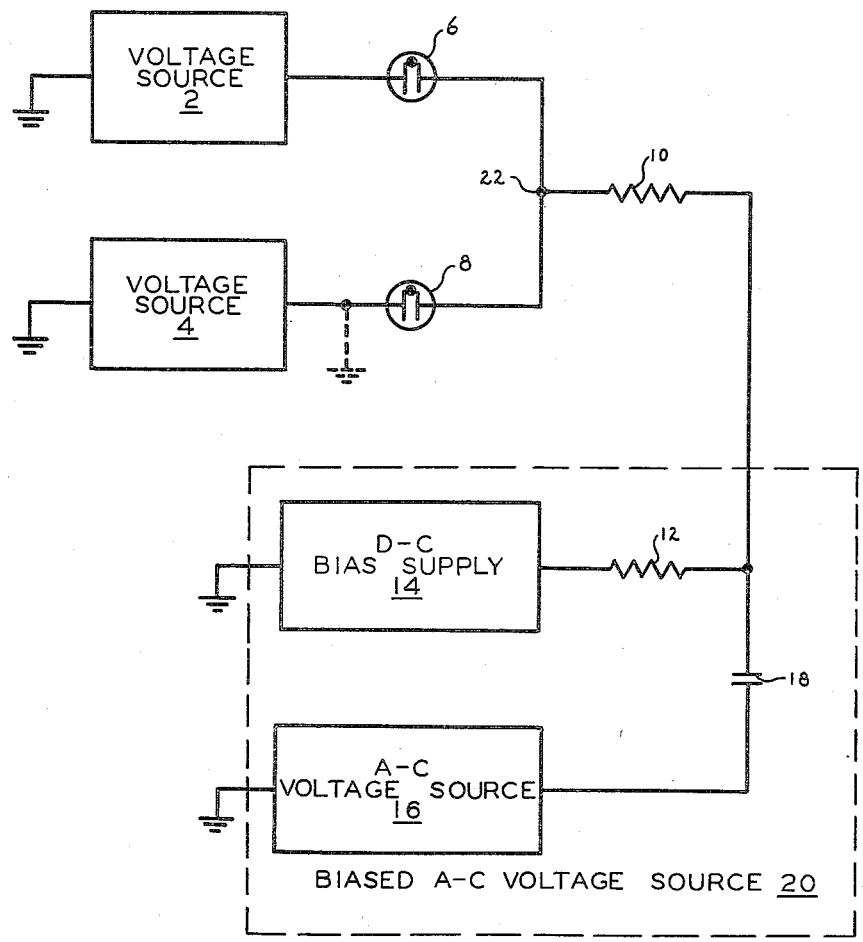

United States Patent Office 2,848,685

2,848,685

VOLTAGE INDICATOR

Morton Mondschein, Belle Harbor, N. Y., assignor to Underwood Corporation, New York, N. Y., a corporation of Delaware Application December 28, 1953, Serial No. 400,471

8 Claims. (Cl. 324—122)

This invention relates to voltage indicating devices, and more particularly to devices which produce visible voltage indications.

In many electrical circuits, there are terminals from which varying voltages are transmitted to control associated apparatus. In certain of these circuits, notably telephone and computer circuits, such voltages are often visibly indicated by the use of glow discharge tubes which illuminate when subjected to certain voltage levels.

The use of the glow discharge tube as a visual indicator provides a convenient check on the operating voltages of circuits and partially obviates the use of comparatively expensive meters as well as the need for interrupting circuit operation to check these voltages. Glow discharge tubes are also used because of their very low power requirements.

In many applications, glow discharge tubes (e. g. neon tubes) may particularly be used to indicate which of a number of terminals is at the highest or the lowest voltage level.

It is accordingly an object of the invention to provide an improved type of voltage indicator.

Another object of the invention is to provide improved apparatus to indicate voltages whose magnitudes are insufficient to operate the apparatus.

A further object of the invention is to provide an improved voltage indicator to indicate visually which of a number of voltages is of most extreme magnitude in a given direction of polarity.

A still further object of the invention is to provide apparatus for indicating which of a number of terminals is at either the highest or lowest voltage level when the voltages involved are not of sufficient magnitude to cause a glow discharge tube to illuminate.

Briefly stated, the preferred embodiment of the invention comprises neon tubes which couple the voltage sources whose voltage magnitudes are to be indicated to a biased alternating-current voltage source which impresses cycles of varying voltages across the neon tubes. The first neon tube which is subjected to sufficient voltage ignites. The operation of one neon tube is utilized to prevent the remainder of the neon tubes from igniting.

It should be noted that the invention avoids the need for mechanical equipment for extinguishing the neon tube and further that the operation of one neon tube excludes the possibility of any other neon tube glowing at the same time.

Other objects and advantages of the invention will appear in the subsequent detailed description which is accompanied by a drawing wherein the sole figure shows a schematic diagram of one embodiment of the invention.

The figure is modified as illustrated by the dotted lines to show another embodiment of the invention.

Referring now to the figure, the invention is shown as providing voltage indications for the two voltage sources 2 and 4 by means of the two associated neon tubes 6 and 8. Although only two voltage sources 2 and 4 have been chosen with which to illustrate the invention, it should be understood that the number is so limited only to simplify the following explanation and that additional voltage sources may be included in the circuit. For convenience the magnitude of all voltage sources will be stated with reference to ground potential.

The neon tubes which are used in the invention are standard neon tubes whose typical characteristics enable them to ignite (discharge) and become luminescent (glow) at one voltage level, to maintain the luminescence at some lower level which is substantially constant, and to extinguish at some slightly lesser voltage level. Thus, for example, the neon tubes 6 and 8 may be neon tubes of the type which ignite at about seventy-five volts, continue glowing at about sixty volts and extinguish when the voltage drops a few volts to about fifty-eight volts.

The voltage sources 2 and 4 are coupled, respectively, by the neon tubes 6 and 8 to the terminal 22 of the resistor 10. The opposite end of the resistor 100 is coupled via the resistor 12 to a D.-C. bias supply 14 and via the capacitor 18 to an A.-C. voltage source 16.

The resistor 12, the capacitor 18, the D.-C. bias supply 14, and the A.-C. voltage source 16 constitute a biased A.-C. voltage source 20 in which the resistor 12 is a voltage-restoring resistor which is used in biasing the A.-C. voltage source 16, and the capacitor 18 isolates the A.-C. voltage source 16 from the D.-C. bias supply 14. The biased A.-C. voltage source 20 may be replaced by any of the similarly-functioning pulsating D.-C. sources well known to those skilled in the art.

The D.-C. voltages of each of the voltage sources 2 and 4 vary such that the voltage at one of the voltage sources 2 and 4 is always of different magnitude and/or sign from the voltage at the other source.

It will be noted that the voltage impressed across the neon tube 6 when the neon tubes 6 and 8 are not ignited is the algebraic difference between the potential of the voltage source 2 and the instantaneous value of the voltage of the biased A.-C. voltage source 20 at a given time. At the same time, the voltage across the neon tube 8 is the algebraic difference between the voltages of the voltage source 4 and the biased A.-C. voltage source 20.

Thus, for example, if the voltages of the voltage sources 2 and 4 are respectively plus five and minus ten volts, and the instantaneous value of the voltage of the biased A.-C. voltage source 20 is plus sixty-five volts, the voltages across the neon tubes 6 and 8 are respectively sixty and seventy-five volts. Therefore, the neon tube 8 will ignite whereas the neon tube 6 will not.

Once one of the neon tubes 6 or 8 ignites, for example, the neon tube 8, a substantially constant voltage drop across the luminescent neon tube 8 is maintained. For the typical neon tube previously noted this voltage drop is in the order of sixty volts. Increases in the instantaneous value of the voltage of the biased A.-C. voltage source 20 will only increase the current drawn through the ignited neon tube 8 without substantially changing the voltage drop across that neon tube. The increased current causes a corresponding increase in the voltage drop across the resistor 10 through which the current is drawn. As a result, the voltage at the terminal 22 never reaches a magnitude which can cause the remaining neon tube 6 to ignite.

In summary, the luminescence of one of the neon tubes 6 or 8 prevents the remaining tube from being ignited so that a single exclusive indication is assured.

The parameters of the components of the biased A.-C. voltage source 20 are chosen to supply certain maximum and minimum magnitudes of instantaneous voltage in accordance with the magnitudes of voltage to be indicated by the glowing of one of the neon tubes 6 or 8.

Additionally, to avoid the necessity of including other means to extinguish the glowing neon tube 6 or 8, the instantaneous voltage of the biased A.-C. voltage source 20 must at some time reach a value which is sufficiently low to extinguish the glowing neon tube 6 or 8.

For example, it has already been shown that if the instantaneous value of the voltage of the biased A.-C. voltage source 20 is sixty-five volts and the voltage source 4 supplies minus ten volts, the neon tube 8 ignites the electron current flowing from the voltage source 4 to the biased A.-C. voltage source 20. If, additionally, the biased A.-C. voltage source 20 later supplies an instantaneous voltage of less than fifty volts, the algebraic difference of the voltages applied to the neon tube 8 is a few volts less than sixty volts and the neon tube 8 is extinguished.

Thus, in a somewhat marginal design some instantaneous voltage values will be generated (by the biased A.-C. voltage source 20) which are greater than sixty-five volts and some which are less than fifty volts. As a result, the neon tube 6 or 8 receiving the less positive of the two voltages (plus five or minus ten volts) will not only be ignited during a cycle of the voltage supplied by the biased A.-C. voltage source 20 but will also be extinguished during the same cycle. This ability to cyclically extinguish enables the other neon tube 6 or 8 to be ignited in the event of changes of voltages at the voltage sources 2 or 4 in a subsequent cycle; otherwise the continuing glowing of one of the neon tubes 6 or 8 would prevent the igniting of the remaining neon tube.

It should be noted that the voltage swing of the biased A.-C. voltage source 20 should be chosen to permit the neon tubes 6 or 8 to be electron conductive in only one direction, for example, toward the biased A.-C. voltage source 20. So, in the example given, if the biased A.-C. voltage source 20 is chosen to swing between plus sixty-five volts and minus seventy volts, the voltage across the neon tube 6 would, during a portion of the cycle after the neon tube 8 is extinguished, achieve an instantaneous value of seventy-five volts (the algebraic difference between plus five and minus seventy volts) and the neon tube 6 would ignite, the electron current flowing away from the biased A.-C. voltage source 20. In this event, the neon tubes 6 and 8 would alternately ignite. Such a result is undesirable.

It has, perhaps, been noted in the previous examples that the neon tube 6 or 8 receiving the lower (more negative) voltage from its associated voltage source 2 or 4 is the neon tube which gives an indication. In general where the opposite indication is desired (i. e., an indication of the higher voltage), this result may be achieved by the simple expedient of having the voltage supplied by the biased A.-C. voltage source 20, swing about a negative D.-C. bias chosen so that the electron current flows away from the biased A.-C. voltage source 20 when either of the neon tubes 6 or 8 ignite. Stated otherwise, since the neon tube 6 or 8 having the greatest potential difference across it will always ignite and the greatest potential difference will always exist between the most positive potential of the voltage sources 2 and 4 and the biased A.-C. voltage source 20, the neon tube 6 or 8 associated with the voltage source 2 or 4 of the most positive potential will ignite. Thus, the invention provides apparatus for indicating which of a number of different voltages is of the most extreme magnitude in a predetermined direction of polarity.

Another form of the invention is illustrated in the figure wherein one side of the neon bulb 8 is grounded, as shown by the dotted lines, instead of being coupled to the voltage source 4. In this circuit, indications are provided to denote whether the voltage at the voltage source 2 is above or below ground potential.

In summary, in accordance with the invention a circuit is provided which is adaptable for indicating which of a number of voltages is either most negative or positive, and which performs this function even though the voltages are not of sufficient magnitude to operate glow discharge tubes. Further, the invention functions with any number of voltages, and includes positive means for giving exclusive indications of a single voltage. Additionally, the invention provides for the changing of indications without the need for mechanically interrupting the circuit to extinguish the indicating tube.

There will now be obvious to those skilled in the art many modifications and variations utilizing the principles set forth and realizing many or all of the objects and advantages of the circuits described but which do not depart essentially from the spirit of the invention.

What is claimed is:

1. A voltage indicator for indicating the one of a plurality of voltage sources having the greater potential of a predetermined polarity, said indicator comprising an indicating means connected to each source, each said indicating means requiring application thereto of a voltage differential of one magnitude to initiate an indication and becoming non-indicating at a voltage differential of lesser magnitude, a common voltage supply for all said indicators, said common supply supplying a voltage of a polarity opposite to said predetermined polarity and which voltage differs from said voltage of greater potential by a varying voltage differential which alternates from more than said one magnitude to less than said lesser magnitude, and means connecting said common voltage supply to all said indicating means and acting to decrease the effective voltage of said common voltage supply to all said indicating means whereby indication by any other indicating means is inhibited when an indication is initiated in one indicator.

2. A voltage indicating device for indicating the one of a plurality of voltage sources having the greater potential of a predetermined polarity, said device comprising a plurality of two-terminal conductive indicators, each indicator having one terminal connected to the output of a voltage source and each indicator becoming conductive to render an indication upon application to its terminals of a voltage differential of one magnitude and becoming non-conductive when the voltage differential is of lesser magnitude, a common voltage supply supplying a voltage having a fixed component of opposite polarity to said predetermined polarity which component when combined with said greater potential provides a voltage differential intermediate said one magnitude and said lesser magnitude voltage differentials, said common voltage supply also supplying an alternating component which combines with said fixed component to provide a voltage differential for said indicator connected to said voltage source of greater potential, which voltage differential varies from above said one magnitude to below said lesser magnitude and resistive means connecting said common voltage source to the remaining terminals of all said indicators.

3. A voltage indicating device for indicating the one of a plurality of voltage sources having the greater potential of a predetermined polarity, said device comprising a plurality of two-terminal conductive indicators, each indicator having one terminal connected to the output of a voltage source and each indicator becoming conductive to render an indication upon application to its terminals of a voltage differential of one magnitude and becoming non-conductive when the voltage differential is of lesser magnitude, a common voltage supply supplying a voltage having a fixed component of opposite polarity to said predetermined polarity which component when combined with said greater potential provides a voltage differential intermediate said one magnitude and said lesser magnitude voltage differentials, said common voltage supply also supplying an alternating component which combines with said fixed component to provide a voltage differential for said indicator connected to said voltage source of greater potential, which voltage differential varies from above said one magnitude to below said lesser magnitude and means connecting said voltage source to the remaining terminals of all said indicators, said connecting means including a part effective to reduce the voltage differential applied to the remaining terminals of said indicators when any indicator becomes conductive.

4. A voltage indicator to indicate the one of a plurality of voltage sources which is at the highest potential of a predetermined polarity, said indicator comprising an indicating means connected to each voltage source, each indicating means requiring a given potential difference to initiate an operation thereof and a lesser potential difference to maintain operation of said means, a source of cyclically varying potential of an opposite polarity and a voltage reducing device connected between all of said indicating means and said cyclically varying potential source, the instantaneous voltages of said varying potential source ranging between a voltage differing from said highest potential by more than said given potential difference and a voltage differing from said highest potential by less than said lesser potential difference.

5. A voltage indicator to indicate the one of a plurality of input voltages which has a predetermined voltage, said indicator comprising a like plurality of indicating devices one for each input voltage, each device becoming operative when subjected to a given potential, remaining operative when said given potential is reduced but becoming inoperative at a lesser potential, a source of cyclically varying voltage, said varying voltage ranging between a voltage differing from said predetermined voltage by more than said given potential but differing from the voltage of the other of said voltage sources by less than said given potential and a voltage differing from said predetermined voltage by less than said lesser potential, means to normally subject each indicating device to the instantaneous potential difference between said cyclically varying voltage and the voltage of its input voltage, and a voltage reducing means between said source of varying voltage and said indicating devices to reduce all said instantaneous potential differences to less than said given potential difference when one of said indicating devices is operating.

6. A voltage indicator for indicating the one of plurality of voltage sources which has the highest potential of a given polarity, said indicator comprising a plurality of two terminal glow discharge devices, each discharge device having one terminal connected to one of said voltage sources, the remaining terminals of said discharge devices being connected together, a resistor connected to said remaining terminals, and a source of D. C. biased alternating voltage connected to said resistor and the reference potential point for said voltage sources, said biased alternating voltage being biased opposite to said given polarity and having a cyclic range between the voltages sufficient to cause discharge in one of said discharge devices and a voltage which is insufficient to maintain a discharge in said discharge devices.

7. A voltage indicator for indicating which of two voltage sources has a predetermined potential, said indicator comprising two neon tubes, one plate of each of said neon tubes being connected to a corresponding one of said voltage sources, the voltage of each of said voltage sources being of a magnitude insufficient to render said connected neon tube conductive, a first resistor connected at one end to the remaining plates of said neon tubes and a biased alternating voltage source, said biased alternating voltage source including a second resistor and a capacitor, each connected at one end to the other end of said first resistor, a biasing voltage source connected between the other end of said second resistor and the reference point of said voltage sources, and an alternating voltage source connected between the other end of said capacitor and said reference point, said biased alternating voltage source providing a voltage having varying instantaneous magnitudes reaches a displurality of neon tubes connected to said predetermined potential becoming conductive when the algebraic difference between its connected voltage and said voltage having varying instantanteous magnitudes reaches a discharge potential and terminating conduction when the algebraic difference between its connected voltage and said voltage having varying instantaneous magnitudes becomes less than the extinguishing potential of said neon tube, the amplitude of said voltage having varying instantaneous magnitudes being insufficient to enable any of said plurality of neon tubes to conduct in an opposite direction.

8. A voltage indicator for indicating when the voltage of a voltage source has a predetermined polarity with respect to a ground level, said indicator comprising two neon tubes, one of said tubes having one plate connected to said voltage source and the other tube having one plate connected to said ground level, the voltage of said voltage source being of a magnitude which cannot render said one neon tube conductive, a first resistor connected at one end to the remaining plates of said two neon tubes, and a source of biased alternating voltage, said biased alternating voltage source including a second resistor and a capacitor each connected at one end to the remaining end of said first resistor, a biasing source having a polarity opposite to said predetermined polarity and connected between the said second resistor and said ground level and an alternating voltage source connected between said capacitor and said ground level, said biased voltage source providing a voltage having varying instantaneous magnitudes, each of said two neon tubes being subjected to the algebraic difference between the voltage on said one plate and said voltage having varying instantaneous magnitudes to cause a discharge in the one of said neon tubes which is subjected to the greater algebraic potential difference, said first resistor thereafter maintaining the voltage applied to the remaining plates of said neon tubes at a discharge maintaining potential, the amplitude variation of said voltage having varying instantaneous magnitudes being insufficient to reverse the polarity of the voltage difference to which said neon tubes are subjected.

References Cited in the file of this patent

UNITED STATES PATENTS

| | | |
|---|---|---|
| 1,744,840 | Strieby et al. | Jan. 28, 1930 |
| 1,918,834 | Crago | July 18, 1933 |
| 2,411,848 | Camras | Dec. 3, 1946 |

UNITED STATES PATENT OFFICE
CERTIFICATE OF CORRECTION

Patent No. 2,848,685                            August 19, 1958

Morton Mondschein

It is hereby certified that error appears in the printed specification of the above numbered patent requiring correction and that the said Letters Patent should read as corrected below.

Column 6, lines 12 and 13, claim 7, for "reaches a displurality of neon tubes" read -- , the one of said plurality of neon tubes --.

Signed and sealed this 11th day of November 1958.

(SEAL)
Attest:

KARL H. AXLINE                                            ROBERT C. WATSON
Attesting Officer                                           Commissioner of Patents